(12) United States Patent
Fang

(10) Patent No.: US 6,959,209 B2
(45) Date of Patent: Oct. 25, 2005

(54) SWITCHABLE OMNI-DIRECTIONAL ANTENNAS FOR WIRELESS DEVICE

(75) Inventor: Chien-Hsing Fang, Dali (TW)

(73) Assignee: Acer Neweb Corp., Taipei Hsien (TW)

( * ) Notice: Subject to any disclaimer, the term of this patent is extended or adjusted under 35 U.S.C. 154(b) by 783 days.

(21) Appl. No.: 09/934,540

(22) Filed: Aug. 23, 2001

(65) Prior Publication Data

US 2002/0183032 A1    Dec. 5, 2002

(30) Foreign Application Priority Data

May 31, 2001    (TW) ................................. 90113165 A

(51) Int. Cl.$^7$ ............................................... H04B 1/38
(52) U.S. Cl. ...................................... 455/571; 455/574
(58) Field of Search ........................................ 455/450

(56) References Cited

U.S. PATENT DOCUMENTS

| | | | | |
|---|---|---|---|---|
| 5,689,439 A | * | 11/1997 | Weerackody et al. | 370/329 |
| 5,818,871 A | * | 10/1998 | Blakeney et al. | 375/220 |
| 6,035,183 A | * | 3/2000 | Todd et al. | 455/226.2 |
| 6,408,193 B1 | * | 6/2002 | Katagishi et al. | 455/571 |
| 6,448,933 B1 | * | 9/2002 | Hill et al. | 343/702 |
| 2002/0149705 A1 | * | 10/2002 | Allen et al. | 348/734 |

FOREIGN PATENT DOCUMENTS

JP    2000-284854    10/2000

* cited by examiner

*Primary Examiner*—Creighton Smith
(74) *Attorney, Agent, or Firm*—Michael Bednarek; Pillsbury Winthrop Shaw Pittman LLP

(57) ABSTRACT

Disclosed is an electronic device having wireless communication functions via a pair of antennas. The device can function under two operating states, both with an omni-directional radiation pattern in the horizontal plane. This is accomplished by an antenna pair mounted separately thereon, the first antenna thereof being omni-directional in the horizontal plane when the device is operative under the first operating state, and the second antenna thereof being omni-directional in the horizontal plane when the device is operative under the second operating state. Also included in the device are a wireless communication module for encoding and decoding signals that are transmitted and received, respectively, during wireless communication through the antenna pair; a RF switch coupling the wireless communication module to the first antenna and second antenna for switching between the first antenna and second antenna; and a trigger switch for detecting the transition of the electronic device between the first operating state and second operating state that causes rotation in space of the antenna pair, and for triggering the RF switch in responsive thereto. The RF switch switches to the first antenna as the electronic device transitions to the first operating state, and the RF switch switches to the second antenna as the electronic device transitions to the second operating state.

12 Claims, 6 Drawing Sheets

SWITCHABLE OMNI-DIRECTIONAL ANTENNAS FOR WIRELESS DEVICE

REFERENCE TO RELATED APPLICATIONS

The present application claims priority to Taiwan application NO. 090113165 entitled "Switchable antenna device with omni-directional radiation pattern and apparatus incorporating the same" filed on $31^{st}$ May 2001.

BACKGROUND OF THE INVENTION

1. Field of the Invention

The present invention relates to wireless communication technology. It more particularly relates to a wireless communication device that alters its operating mode in accordance with the operating state of an electronic apparatus whereto it is bundled for the purpose of maintaining an omni-directional radiation pattern. The present invention allows a more stable and reliable wireless transmission capability by ensuring that the antenna device always operates with best transmission quality even though the apparatus may vary its physical orientation when being operative. Obviously, the present invention is most suitable for portable wireless communication systems without fixed physical locations and orientations, such as notebook computers having network interface cards, or wireless network access points.

2. Description of the Related Art

Antennas provide wireless communication functionality to mobile devices and have become key components in the mobile telecommunication field. An antenna is practically an arrangement of metal substances in accordance with the theory of electromagnetic (EM) fields known as Maxwell's equations such that a particular pattern of electromagnetic wave can be radiated or received. A practical antenna can be manufactured into different size and structure that satisfy the physical requirements of a particular usage, with different radiation pattern or receiving pattern. Usually an antenna radiates power or electromagnetic energy in such a way that the radiation intensity varies as a function of spatial direction. That is, the antenna does not radiate equal power in all directions. Therefore, to obtain higher gain and better transmission quality between two antennas fixed in space, it is desirable to orient and direct one antenna with the main lobe of its radiation pattern in which the maximum intensity lies pointing right to the other antenna. But for two antennas not installed in fixed locations, such as those bundled into notebook computers for mobile transmission, spatially orienting the antennas in advance is not useful for obtaining high radiation and reception quality because the mobile antennas will constantly change their relative physical positions.

For wireless transmission of mobile devices, one has to resort to antennas of omni-directional radiation pattern that radiate electromagnetic energy of substantially same intensity in all directions. Since two mobile devices communicating wirelessly with each other can be regarded for most of the time as lying in a horizontal plane, for practical reasons we only require that a mobile antenna is omni-directional in the horizontal plane.

FIG. 1 and FIG. 2 illustrate one solution for the above-mentioned orientation problem according to the prior art. A typical antenna 110 with omni-directional radiation pattern is incorporated into notebook computer 100 for wireless communication. The antenna 110 is omni-directional only in a plane making a specific angle with respect to its longitudinal structure. That is, the antenna has its main lobe lying on a predetermined plane relative to its physical conducting structure in which its radiation intensity is substantially equal in magnitude for all directions. In FIG. 1a, the antenna 110 is mounted on the side of the display panel 102, and is controlled by a wireless communication module 103. When the display panel 102 is open, the antenna 110 creates in the XY, or horizontal plane an omni-directional electromagnetic radiation pattern as illustrated in FIG. 1b. Because the antenna 110 is omni-directional, best performance in radiating electromagnetic signals to, or receiving from, all directions in the horizontal plane can be ensured even though the notebook computer 100 may rotate along Z-axis when being operative. In this way, the notebook computer 100 is able to wirelessly communicate with a device in all directions on the horizontal plane.

But in particular operating conditions wherein the display panel 102 is closed but the notebook computer 100 is still functioning as illustrated in FIG. 2a, the antenna 110 necessarily alters its physical orientation, which results in its horizontal radiation pattern being no longer omni-directional, but rather having significant drops of intensity value or nulls in particular directions as indicated in FIG. 2b. Under such circumstances, the probability that the notebook computer 100 experiences transmission malfunctions would be increased.

It is possible to have the antenna 110 installed in host 101 to avoid the orientation problem. But clustering the antenna 110 with other electronic components within host 101 necessarily amplifies electromagnetic interference there between and induces negative effects on the antenna 110.

SUMMARY OF THE INVENTION

The prior art described has the disadvantage of not being able to provide an omni-directional horizontal radiation pattern when the mobile device, and hence the antenna itself mounted thereon, are being constantly reoriented in their possible operating states. This would limit the transmission efficiency and gain. It is thus desirable to have an antenna means capable of maintaining an omni-directional horizontal radiation pattern even when the apparatus comprising the antenna means is reoriented under different operating states.

The present invention discloses an electronic device having the capability of wireless communication through two mutually switchable antennas mounted thereon. One of the antennas is omni-directional in the horizontal plane when the device is operating in its first state, while the other antenna is omni-directional in the horizontal plane when the device is operating in second operating state. The switching between the antennas is automatically or manually triggered in conjunction with transition from the first state to the second state and vice versa. The transition occurs as the device reorients itself, so do the antennas, during normal usage. The switching is to effect a selection from the antennas of one that is currently omni-directional in the horizontal plane, so that the device retains its transmission quality as its user changes the operating state. The present invention does not exclude any existing transmission protocol, and is particularly useful for movable wireless devices using Bluetooth or IEEE 802.11b.

In one embodiment of the present example, two antennas are separately installed on the display panel of a notebook computer having first operating state when the display panel is open and second operating state when the display panel is closed. The first antenna is horizontally omni-directional when the display panel is open, and the second antenna is horizontally omni-directional when the display panel is closed. A mechanical switch is placed near the hinge linking the display panel and the host in such a way that when the display panel is being opened or closed to the first and second operating state, respectively, the switch is released or depressed and thereby causes the first or the second antenna, respectively, to be the active antenna for radiating and receiving EM signals.

Accordingly, the object of the present invention is to provide a pair of antennas for a wireless communication device, each having an omni-directional radiation pattern in a specific plane relative to the device under a corresponding operating state. As the operating state of the device alters, the function of radiating and receiving signals is transferred from one antenna to the other with the active antenna being omni-directional in that specific plane.

Another object of the present invention is to provide a wireless electronic device having a switchable antenna pair for maintaining an omni-directional radiation pattern in a predetermined plane when the device is being converted from one operating state to the other according to how it is utilized by the user. The protocol used for wireless transmission is not limited.

BRIEF DESCRIPTION OF THE DRAWINGS

The following detailed description, which is given by way of example, and not intended to limit the invention to the embodiments described herein, can best be understood in conjunction with the accompanying drawings, in which.

DETAILED DESCRIPTION OF THE INVENTION

What follows is a detailed description of embodiments of the present invention for the purpose of fully disclosing the various features of the present invention and its improvements over the prior art in conformity with patent law. The present invention relates to a combination of antennas for an electronic device having different operating states. The antennas are mutually switchable, and for each of the operating state of the device an omni-directional radiation pattern in the horizontal plane will be generated by switching between the antennas. The present invention is conceptual and can be applied to each and every wireless transmission standard and protocol.

Figure 1A:
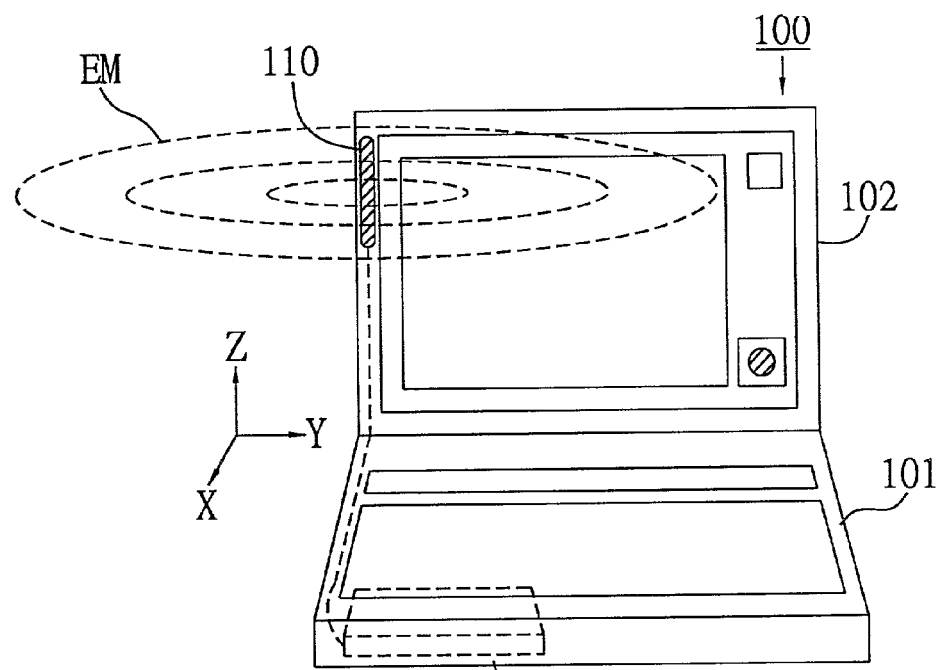
FIG. 1a illustrates according to the prior art the omni-directional radiation pattern of an antenna mounted besides the display panel of a notebook computer when the display panel is open.
Figure 1B:
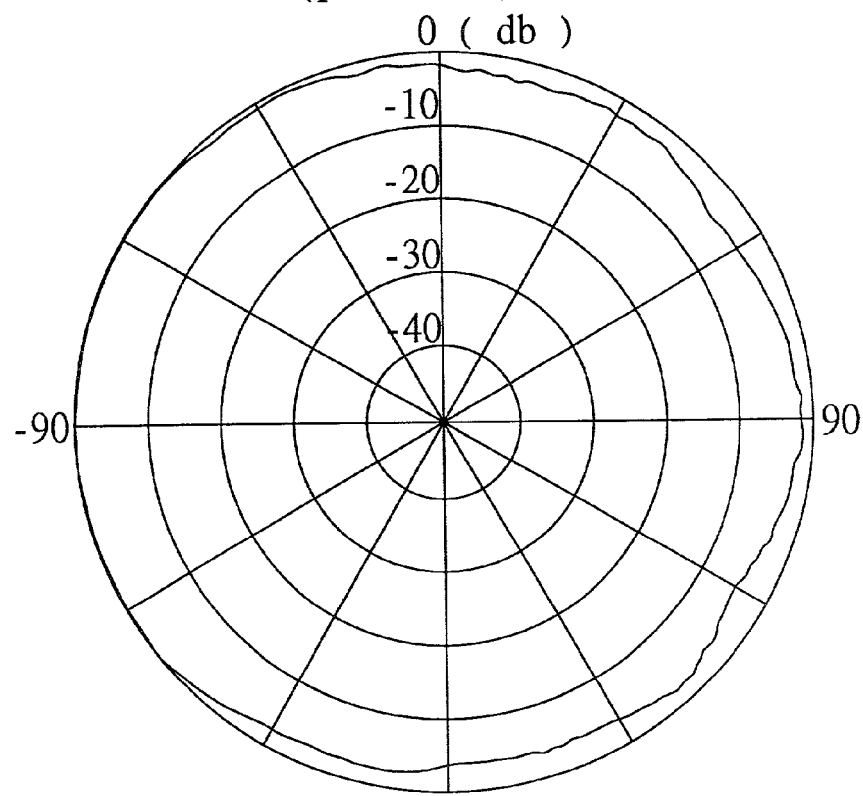
FIG. 1b illustrates the radiation pattern of the omni-directional antenna of FIG. 1a in the horizontal plane.
Figure 2A:
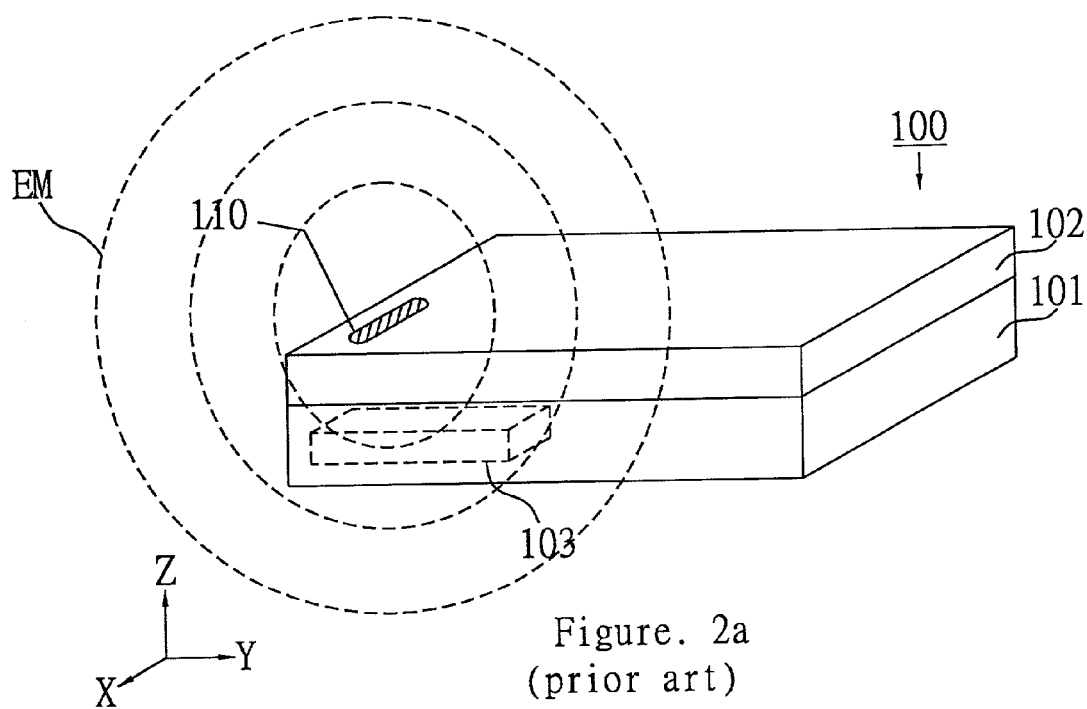
FIG. 2a illustrates according to the prior art the omni-directional radiation pattern of an antenna mounted besides the display panel of a notebook computer when the display panel is closed.
Figure 2B:
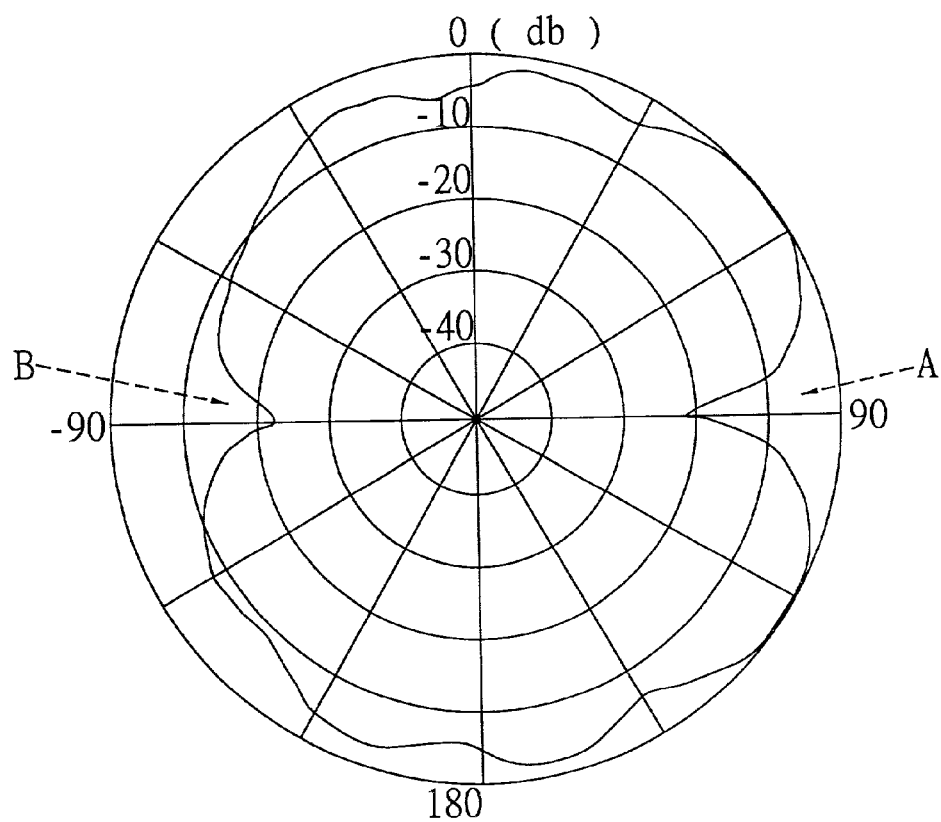
FIG. 2b illustrates the radiation pattern of the omni-directional antenna of FIG. 2a in the horizontal plane.
Figure 3:
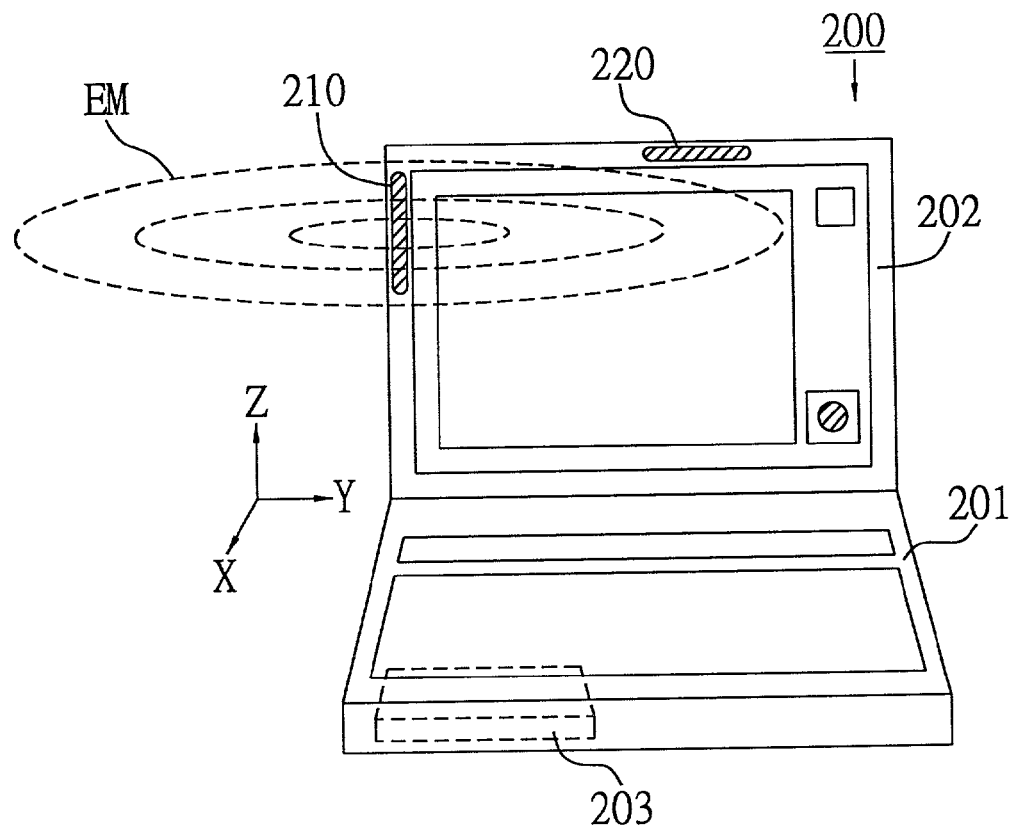
FIG. 3 illustrates one embodiment of the present invention wherein two switchable omni-directional antennas are installed in a notebook computer, one being omni-directional in the horizontal plane when the display panel is open.
Figure 4:
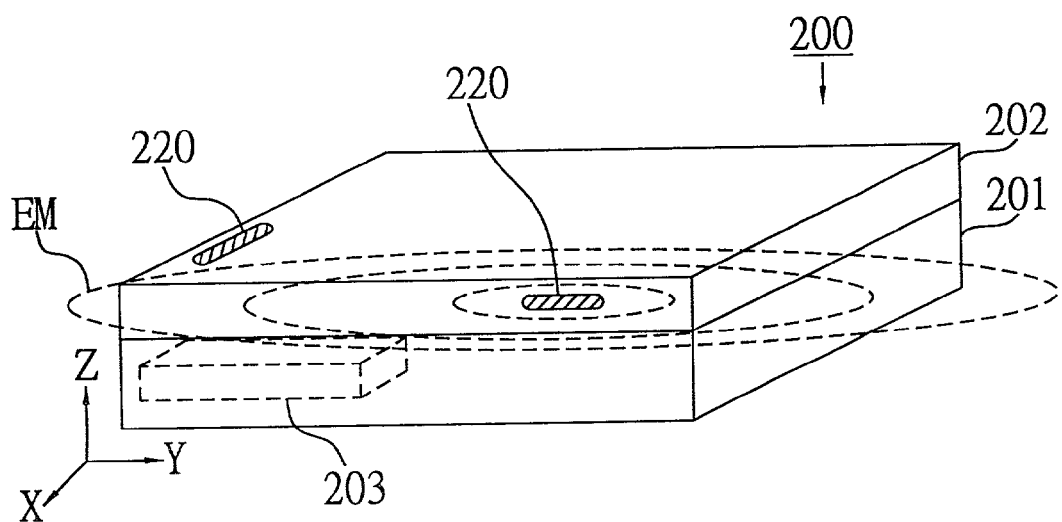
FIG. 4 illustrates one embodiment of the present invention wherein two switchable omni-directional antennas are installed in a notebook computer, one being omni-directional in the horizontal plane when the display panel is closed.

FIG. 3 and FIG. 4 illustrate one embodiment of the present invention wherein two switchable omni-directional antennas are installed in a notebook computer. The omni-directional antennas 210 and 220 are mounted on the left side and top of the display panel 202 of the notebook computer 200, respectively, and are controlled by a wireless transmission module, or network card 203. The antenna 210 is omni-directional in X-Y, or horizontal, plane and the antenna 220 is omni-directional in Y-Z, or vertical, plane as shown in FIG. 3 when the notebook computer 200 is in normal operating state and the display panel 202 is open. In this state the antenna 210 is put to function because it is more effective than the antenna 220 for EM transmission with another wireless device that for most situations can be regarded to be lying in the horizontal plane. When the notebook computer 200 switches to another operating state with the display panel 202 closed as shown in FIG. 4, the orientations of the antennas 210 and 220 alter with the rotating of the display panel 202. In this state, the antenna 210 becomes omni-directional in the Y-Z plane and the antenna 220 becomes omni-directional in the X-Y plane. It is needed, therefore, to switch form the antenna 210 to 220 when the notebook computer 200 switches from its open operating state to closed operating state, and vice versa, in order to always have the antenna with omni-directional horizontal radiation pattern be the functioning antenna.

Figure 5:
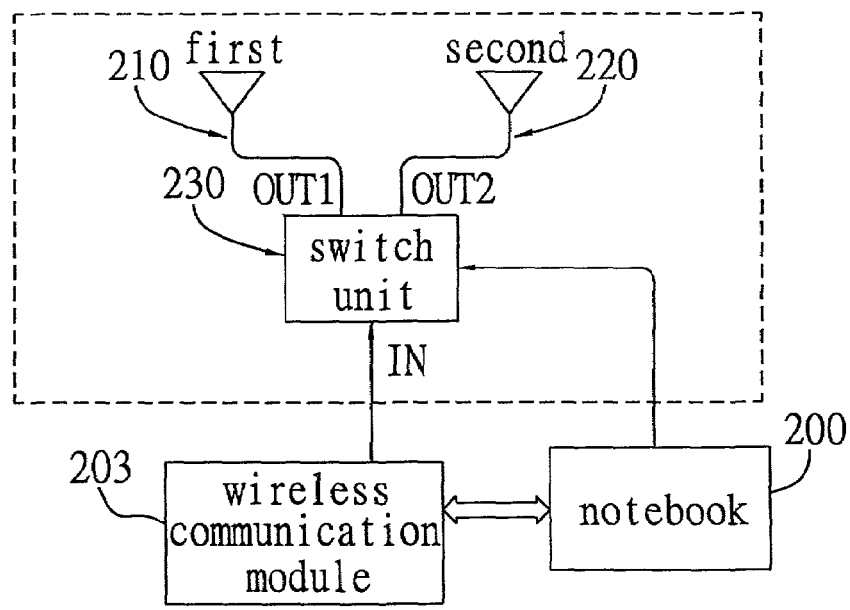
FIG. 5 illustrates the schematic diagram of two switchable antennas for wireless communication according to the present invention.

FIG. 5 illustrates the schematic diagram of the antennas 210 and 220 and a switch unit 230 for switching from one to the other according to the present invention. The switch unit 230 basically includes a RF switch, an input (IN) port connecting to the wireless communication module 203, say, Bluetooth module, for exchanging electrical signals, and two output ports connecting to the antennas 210 and 220 for exchanging signals, wherein OUT1 port connects to the first antenna and OUT2 port connects to the second antenna. The switch unit 230 connects the IN port to either the OUT1 port or OUT2 port in responsive to the change of states of the notebook computer 200. During the first state, wherein the display panel 202 is open, the switch unit 230 connects the IN port to the OUT1 port, thereby allowing the notebook computer 200 to radiate and receive EM signals via the first antenna 210 whose present orientation is to produce an omni-directional radiation pattern in the horizontal X-Y plane. At the time when the second state wherein the display panel 202 is closed is entered, the switch unit connects the IN port to the OUT2 port, and the second antenna 220 is used for radiating and receiving EM signals which under its present orientation is omni-directional in the horizontal plane. Again, when the user of the notebook computer 200 switches back to the first operating state, the switch unit 230 concurrently reconnects the IN port to the OUT1 port. In any event, the switch unit 230 always follows the change of state of the notebook computer 200 in connecting the IN port to either the first or the second antenna that is horizontally omni-directional in accordance with the present operating state.

Figure 6:
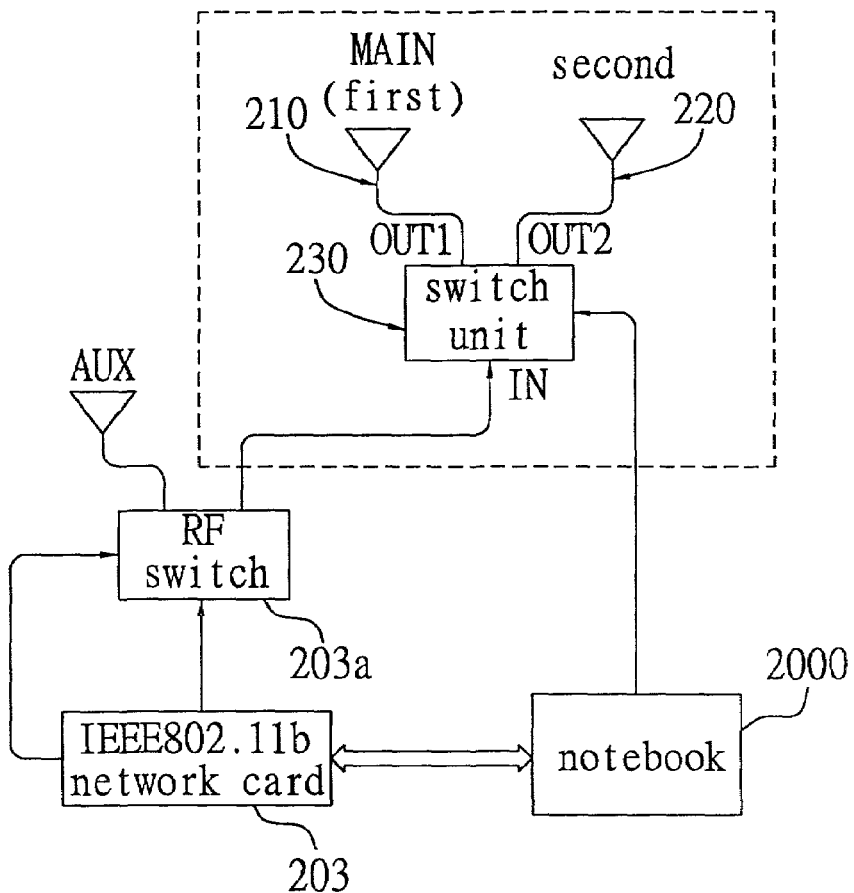
FIG. 6 illustrates the schematic diagram of three switchable antennas compatible to IEEE 802.11b protocol according to the present invention.

Another embodiment of the present invention is illustrated in FIG. 6 wherein the transmission protocol utilized is IEEE 802.11b. According to the protocol, two antennas are utilized for wireless communication, one labeled as MAIN, the other AUX (auxiliary). The MAIN antenna and the AUX antenna are switchable when receiving EM signals through a RF switch controlled by an IEEE 802.11b module. Because the MAIN antenna and the AUX antenna can be installed separately in different orientations and configurations with different radiation intensity patterns, EM waves originating from a particular direction will cause different receiving intensity levels on the antennas. When receiving EM signals from that direction, the receiving intensity level of the signals on the MAIN antenna, which is closely related to the radiation pattern of the MAIN antenna, is compared to that on the AUX antenna and the one with higher receiving intensity level is selected by the RF switch to be the receiving antenna of the signals. On the other hand, when radiating EM signals into space the IEEE 802.11b protocol sets the MAIN antenna as the only radiating antenna and dose not provide switch mechanism between the MAIN antenna and the AUX antenna.

In FIG. 6 the first antenna 210 is set as the MAIN antenna and the second antenna 220 as an additional antenna to the MAIN and AUX antenna of IEEE 802.11b. For both operating states of the notebook computer 200, one of the MAIN (first) antenna 210 and the second antenna 220 that is presently omni-directional in the horizontal plane is selected, as is described here above. If the notebook computer 200 is radiating EM signals, the selected antenna is the radiating antenna. On the other hand, if the notebook computer 200 is receiving signals, the selected antenna and the AUX antenna will undergo the comparison process outlined here above in order to further select one of the two antennas whose receiving intensity level for the signals is higher as the receiving antenna. Therefore, according to the embodiment in FIG. 6, the radiating antenna for the notebook computer 200 is either the MAIN (first) antenna 210 or the second antenna 220 and is selected by the switch unit 230 that performs the selection, or switching, in accordance with the change of states of the notebook computer 200 to be further described below. On the other hand, the receiving antenna can be any one of the MAIN (first) antenna 210, the second antenna 220, and the AUX antenna and is selected by the RF switch 203a under the control of the IEEE 802.11b module 203. It is noted in the embodiment that the RF switch 203a and the switch unit 230 do not interfere with each other. Furthermore, the AUX antenna can be dropped out in the embodiment and the difference between radiating and receiving signals is cancelled.

Figure 7:
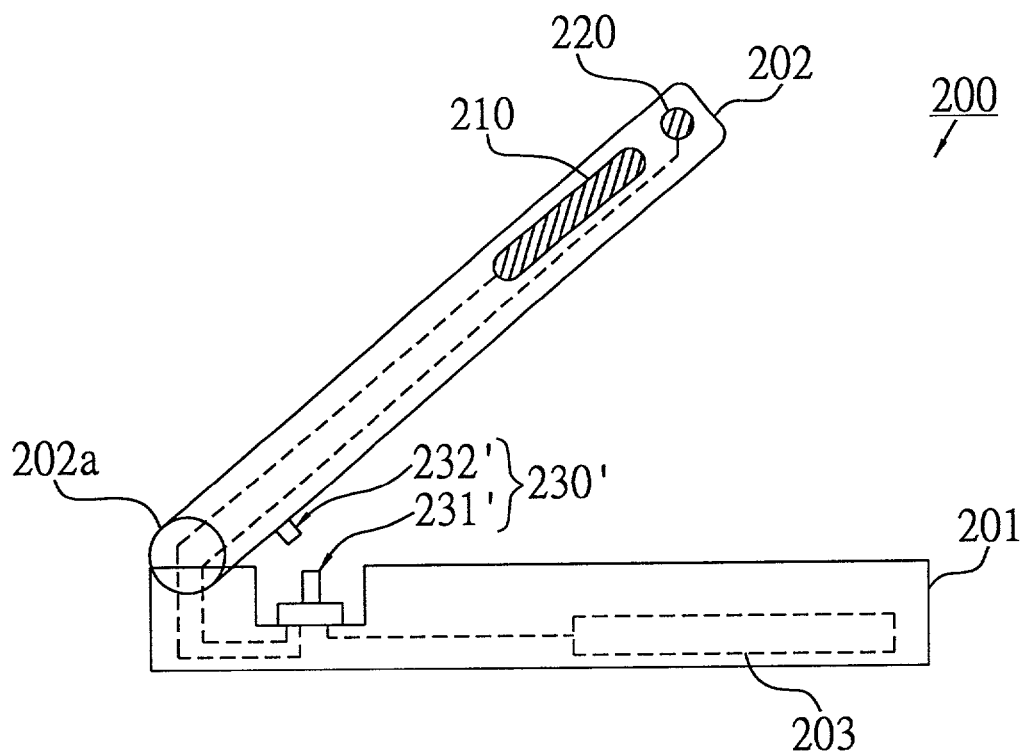
FIG. 7, 8, illustrate two embodiments of the switch for the switchable antennas implemented on a notebook computer according to the present invention.
Figure 8:
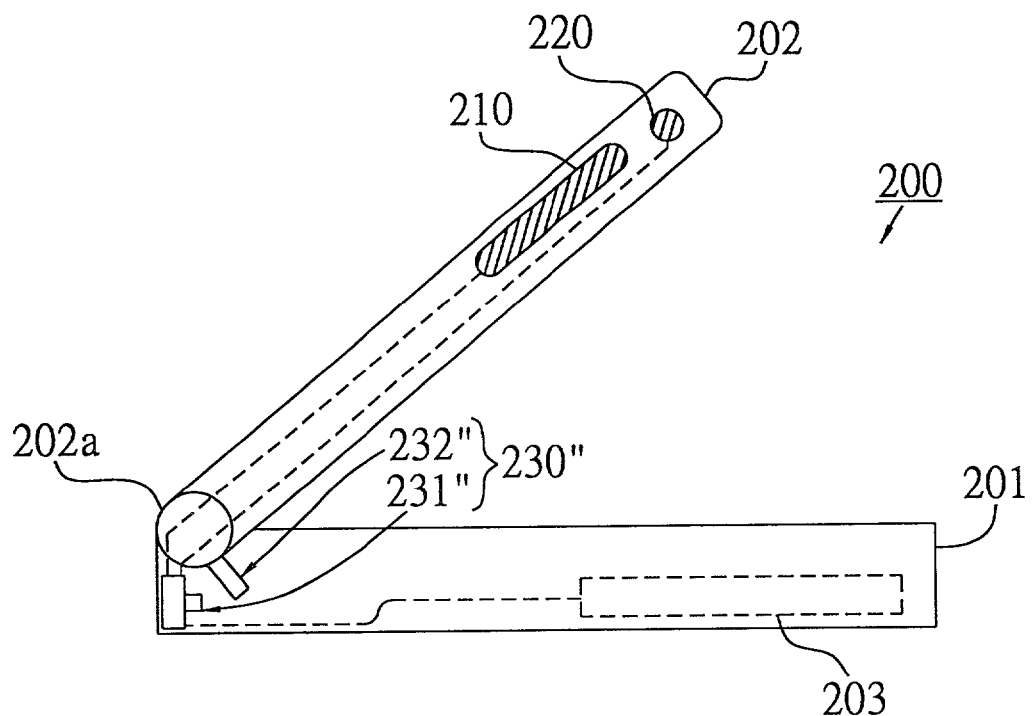

FIGS. 7 and 8 illustrate embodiments of the switch unit 230 for the antennas 210 and 220. In order to switch between the antennas, a trigger device is needed to enable the switching. In FIG. 7, the switch unit 230' further includes a key 231' mounted on the host 201 that switchably connects the wireless communication module 203 to either the first antenna 210 or the second antenna 220, and an enabling pin 232' formed on the display panel 202 for depressing the key 231'. The key 231' and the enabling pin 232' are disposed close to the hinge 202a that links the display panel 202 and the host 201 and are so positioned that when the notebook computer 200 enters the second operating state and the display panel 202 is closed, the enabling pin 232' depresses the key 231'. Upon depression, the key 231' connects the wireless communication module 203 to the second antenna 220 that is presently oriented to be omni-directional in the horizontal plane. On the other hand, when the notebook computer 200 enters the first operating state wherein the display panel is open, the key 231' is released and thereby connects the wireless communication module 203 to the first antenna 210 that is presently omni-directional in the horizontal plane. As another example illustrated in FIG. 8, switching between the antennas is made possible by a key 231" and a pin 232" embedded into the hinge 202a. This gives the notebook computer 200 a more appealing look by concealing the physical structure of the switch unit 230". In addition, instead of using mechanical means, one skilled in the art is also able to make use of other detecting means such as optical sensor or software codes that detects the transition between the operating states so as to switch between the antennas.

Figure 9A:
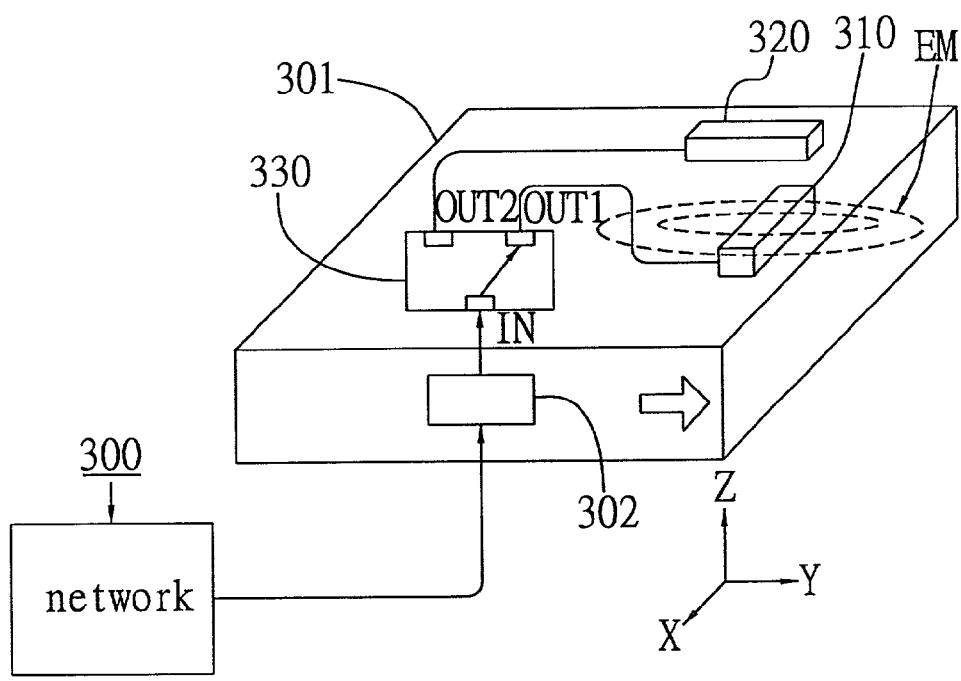
FIG. 9a, 9b illustrate another embodiment of the present invention wherein two switchable antennas are installed into a wireless network access point.
Figure 9B:
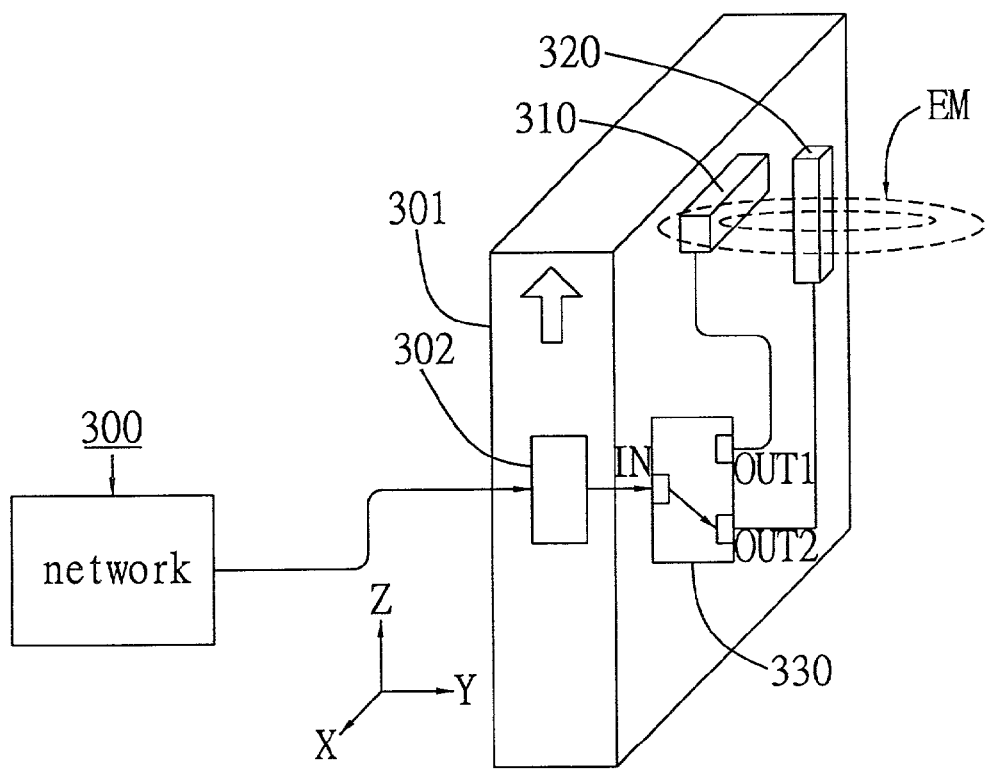

FIG. 9a and FIG. 9b illustrate another embodiment of the present invention wherein two switchable antennas 310 and 320 are installed into a wireless network access point (AP) device 301 connecting to network 300, such as LAN, WAN, and the Internet, through a network interface card 302. The AP device serves as a portal for mobile devices accessing the network 300. In FIG. 9 the AP device 301 is placed horizontal in the first operating state, with the first antenna 310 being horizontally omni-directional and the IN port of switch 330 being connected to the OUT1 port. In FIG. 10 the AP device 301 is placed upright in the second operating state, the second antenna being omni-directional in the horizontal plane and the IN port being switched to connect to the OUT2 port. The switching between antennas 310 and 320 in conjunction with the transition of states of the AP device 301 can be accomplished by using mechanical switch positioned at the bottom of the housing of the AP device 301, so that when it is put in the first state, the mechanical switch is automatically depressed to have the IN port connected to the OUT1 port. On the other hand, when the AP device 301 is operating in the second state, the mechanical switch is automatically released to have the IN port connected to the OUT2 port. The switching can also be accomplished using rotation or position sensors that detect the transition of states as the AP device 301 alters its orientation. In another example of the present invention, the switch can be manually controlled by the user and allows thereby more flexible use of the device.

It is to be noted that the embodiments and particular features and functions as disclosed above are for the purpose of disclosure only and are not in any sense for limiting the scope of the invention. Small modifications and juxtapositions of one or more of the functional elements anticipated by those skilled in the art without departing the spirit of present invention is to be regarded as a part of the invention. Therefore, that the scope of present invention is determined by the appended claims is fully understood.

What is claimed is:

1. An electronic device having wireless communication functions under a first operating state and a second operating state, comprising:

an antenna pair mounted separately thereon, the first antenna thereof being omni-directional in a predetermined plane when said electronic device is operative under said first operating state, and the second antenna thereof being omni-directional in said predetermined plane when said electronic device is operative under said second operating state;

a wireless communication module for encoding and decoding signals that are transmitted and received, respectively, during wireless communication through said antenna pair;

a RF switch coupling said wireless communication module to said first antenna and said second antenna for switching between said first antenna and said second antenna; and a trigger switch for detecting the transition between said first operating state and said second operating state that causes rotation in space of said antenna pair, and for triggering said RF switch in responsive thereto;

wherein said RF switch switches to said first antenna as said electronic device transfers to said first operating state, and said RF switch switches to said second antenna as said electronic device transfers to said second operating state.

2. The electronic device according to claim 1, wherein said predetermined plane is in the horizontal plane.

3. The electronic device according to claim 1, wherein said trigger switch is a mechanical switch.

4. The electronic device according to claim 1, wherein said trigger switch is an optical device.

5. The electronic device according to claim 1, wherein said trigger switch comprises software codes.

6. The electronic device according to claim 1, wherein said wireless communication module follows the standard of IEEE 802.11b protocol.

7. The electronic device according to claim 1, wherein said wireless communication module follows the standard of Bluetooth protocol.

8. The electronic device according to claim 1, wherein said trigger switch can be manually controlled.

9. The electronic device according to claim 1, is a computer having a rotatable unit whereon said antenna pair is mounted, said first operating state and said second operating state being distinguished by the rotation angle of said rotatable unit.

10. The electronic device according to claim 1, is a portable computer with a rotatable display panel whereon said antenna pair is mounted.

11. The electronic device according to claim 1, is a computer appliance, said first operating state and said second operating state each corresponding to a distinct placement thereof.

12. The electronic device according to claim 1, is an access point device having connections to network, said first operating state and said second operating state being the upright and horizontal placement thereof, respectively.

* * * * *